(12) United States Patent
Steinke et al.

(10) Patent No.: US 7,398,809 B2
(45) Date of Patent: Jul. 15, 2008

(54) RUN FLAT TIRE INSERT SYSTEM

(75) Inventors: Richard A. Steinke, Boulder City, NV (US); Theodore M. Love, Las Vegas, NV (US); James G. Moore, Bouder City, NV (US)

(73) Assignee: Amerityre, Boulder City, NV (US)

( * ) Notice: Subject to any disclaimer, the term of this patent is extended or adjusted under 35 U.S.C. 154(b) by 0 days.

(21) Appl. No.: 11/985,844

(22) Filed: Nov. 19, 2007

(65) Prior Publication Data

US 2008/0066842 A1    Mar. 20, 2008

Related U.S. Application Data

(63) Continuation of application No. 11/166,427, filed on Jun. 27, 2005, now abandoned.

(51) Int. Cl.
*B60C 17/04* (2006.01)

(52) U.S. Cl. .................. 152/400; 152/396; 152/520

(58) Field of Classification Search ............ 152/158, 152/396, 399, 400, 516, 517, 518, 519, 520, 152/521
See application file for complete search history.

(56) References Cited

U.S. PATENT DOCUMENTS

| 3,025,898 | A | 3/1962 | Opel |
| 3,250,310 | A | 5/1966 | Johnson |
| 3,814,158 | A | 6/1974 | Ryder |
| 4,246,948 | A | 1/1981 | Sarkissian |
| 5,341,861 | A | 8/1994 | Forte |
| 5,772,805 | A | 6/1998 | Bobst |
| 6,523,587 | B2 * | 2/2003 | Gregory ............... 152/158 |
| 6,679,306 | B2 | 1/2004 | Steinke |
| 7,261,134 | B2 * | 8/2007 | Chen .................. 152/158 |
| 2005/0217781 | A1 | 10/2005 | Gardetto |
| 2006/0005906 | A1 | 1/2006 | Resare et al. |

FOREIGN PATENT DOCUMENTS

| EP | 490585 | 6/1992 |
| EP | 569710 A1 | 11/1993 |

* cited by examiner

*Primary Examiner*—Russell D. Stormer
*Assistant Examiner*—Kip T Kotter
(74) *Attorney, Agent, or Firm*—M. Reid Russell

(57) ABSTRACT

A tire insert system for assembly into a continuous ring during its positioning within a tire, and is supported on a wheel web between the wheel flanges where the continuous tire insert ring is mounted to the wheel to support a tire load for a significant travel distance should that tire lose air. The four tire insert segments each include an arcuate shaped outer portion that, when assembled end to end, form the insert ring, and each tire insert segment includes an anchor plate that is an arcuate section when assembled side by side with other anchor plates forms a flat disk having an open center portion, which anchor plate is secured to the tire insert on its top end and includes mounting holes formed in its lower portion for receiving bolt type fasteners fitted therethrough and through forward and rear wheel sections, sandwiching the anchor plates therebetween, forming the tire insert ring in the tire during a mounting of the tire between wheel flanges.

7 Claims, 6 Drawing Sheets

RUN FLAT TIRE INSERT SYSTEM

This application is a continuation application of application Ser. No. 11/166,427 for a "RUN FLAT TIRE INSERT SYSTEM" filed Jun. 27, 2005 that is abandoned with the entry of this Continuation Application.

BACKGROUND OF INVENTION

1. Field of The Invention

This invention pertains to a run flat tire insert system for a transport tire.

2. Prior Art

The present invention is a tire insert system for fitting into a tire, such as an automobile or truck tire. The insert is formed into a ring, preferably from four sections, that are fitted together into a ring within a tire during the process of mounting the tire on a wheel. Which wheel is formed from front and rear sections, with the rear section preferably including a wheel web and a flange and includes a foot section that is for coupling to the wheel front section, forming the wheel that will hold and maintain a tire containing the ring insert at the tire beads. The tire insert is assembled from tire insert segments that are each fitted into the tire during the mounting of the tire on the wheel, with the insert segments each for mounting, at aligned holes in the front and rear wheels, with the same nut and bolt used for each mounting hole, securing a tire insert anchor plate sandwiched between the wheel front and rear sections. Which tire contains the assembled ring shaped tire insert and the tire beads are fitted across the wheel front and rear sections, with the tire beads held behind each of the wheel flanges ends. So arranged, bolts that receive nuts turned thereover are fitted through the aligned holes in the wheel front and rear sections and tire insert anchor plate, sandwiching the four insert anchor plates therebetween, completing the wheel mounting of the tire wherein the assembled ring is maintained.

The tire insert system of the invention is assembled from four sections in end to end butting arrangement, forming a ring within the tire and each insert anchor plate is secured between the wheel and rear sections so as to form a continuous ring within the wheel that mounts the tire, allowing the clearance between the assembled ring outer surface and the tire inner surface to be close fitting. Whereas, earlier insert arrangements, like those found in run flat tires of major tire manufacturers, have been formed as closed or continuous rings with the ring having to be fitted into the tire by fitting one section of the ring insert into the tire and pulling the other section of the ring insert across the tire bead and into the tire. Accordingly, to allow the ring insert of earlier tire inserts to be pulled across the tire inelastic bead, the earlier insert radius has to be significantly smaller than the radius of the tire inner surface, under the tread. So arranged, with the earlier continuous ring insert installed in a tire, there will exist a space that can be a significant spacing distance for a typical run flat tire. Accordingly, in practice, should a tire with such continuous ring insert go flat, and the tread undersurface collapse into engagement with the earlier ring top surface, the tire side walls will be deeply folded. Such flat tire, when operated at only fifty miles an hour or less, will, because of the deep side wall folds, experience flexure in its sides, causing the tire to overheat and begin to fall apart. Such tire with a continuous ring insert will therefore only travel a few miles, and usually not more than around fifty miles, before it falls apart, stranding the car and driver.

The present invention provides a tire insert that is assembled into a ring during its fitting into the tire, allowing the formed ring to have a radius that is just smaller than the radius of the pressurized tire inner surface under load. Thereby, should the tire lose pressure, the tire side walls will be only slightly bent when the tire inner surface engages the insert surface. This means that less sidewall flexure will occur as the tire rolls under load, generating less heat, and providing a run flat tire having a longer life than other run flat tires when it is run flat under load.

Like the present invention, an earlier run flat tire of one of the applicants, U.S. Pat. No. 6,679,306, shows a tire with an inner support fitted therein for taking up a load upon outer tire deflation. The inner support of this patent, however, is itself a tire that, by its construction, is load bearing at atmospheric conditions and will therefore support the load on an outer air filled tire should that air be lost. The '306 patent, however, is unlike the invention in that it does not involve solid insert segments that are fitted in the tire during the tire mounting on a two piece rim. Additionally, where some earlier U.S. Pat. Nos. 3,250,310; 3,814,158; 4,246,948; and 5,341,861, have shown support rings or auxiliary wheels inside and enclosed by a tire and rim, such, unlike the present invention, have been continuous ring members, or as in the case of the '861 patent have included bolt members that can be turned through the wheel web to extend actuator head ends into the tire to, apparently, engage and support the tire surface under the tread should the tire deflate. None of which arrangements are like the invention where tire insert sections are assembled within the tire, forming the insert ring, during the mounting of the tire on the wheel.

SUMMARY OF THE INVENTION

It is a principal object of the present invention to provide a tire insert system formed in sections for assembly within a tire during mounting of the tire onto a wheel to provide a run flat capability to that tire.

Another object of the present invention is to provide a tire insert ring that is formed from multiple segments, preferably four segments, that each make up a section of the ring, and where each tire insert segment is secured to an anchor plate that has a mounting surface for sandwiching between front and rear sections of a wheel.

Another object of the present invention is to provide a front wheel section having a series of radial holes formed at equal spaced distances around its surface, below a wheel front flange, that will align with holes formed through the assembled insert anchor plates and through holes formed through a rear wheel section, and which aligned holes receive bolts that receive nuts turned thereover forming a wheel with tire insert sections that form a ring shaped outer surface that is positioned in the tire.

Another object of the present invention is to provide a wheel for mounting the tire insert of the invention that is formed in front and rear sections to both mount anchor plate arcuate end portions of a plurality of tire insert segments, forming a ring shaped insert that is maintained within a tire whose beads are contained by opposing flanges of the assembled wheel front and rear sections, and which wheel and tire insert assembly occur together.

Another object of the present invention is to provide tire insert segments arranged for coupling together edge to edge into a ring within the tire during wheel assembly where anchor plates of each insert are mounted, in side by side relationship, to a front wheel section, during the process of mounting the tire to the wheel front and rear sections.

Another object of the present invention is to provide four tire insert segments that, when assembled together in end to end relationship, around the wheel front section, form a ring located within a tire whose beads are fitted between wheel flanges of the respective front and rear wheel sections, where the under surfaces of the insert tire segments nest across the wheel web.

Still another object of the present invention is to provide a run flat tire insert system formed from a plurality of radial tire insert segments that are for joining end to end into a tire insert ring during the tire beads mounting between flange ends of front and rear wheel sections, where the tire insert sections anchor plates extend radially inwardly from the tire insert bottoms and are mounted around the front wheel section, between the wheel front and rear sections.

Still another object of the present invention is to provide a run flat tire insert ring made of a selected elastomeric material to have a desired resiliency that will support and rebound a tire under load that contains the insert ring should the tread of that tire be deflected into the insert ring as by the tire running over an object, such as a rock or curb.

Still another object of the present invention is to provide run flat tire insert system where the tire insert segments are manufactured in arcuate sections for fitting into, forming a continuous ring, and are fitted in the tire during tire mounting between front and rear wheel sections, where each tire insert has an arcuate outer surface, that when fitted together end to end with other insert segments form a continuous ring, and each tire insert is preferably formed by casting methods to incorporate an anchor plate that is bent at approximately a right angle to extend from the tire insert segment undersurface, and which anchor plate is to be fitted together with other anchor plates forming a disk that is open across its center and includes spaced holes formed at intervals therearound that are at like radial distances from the center of the opening and which tire insert anchor plates each have holes that are for aligning with holes formed through the wheel front and rear sections and receive bolts fitted therethrough.

Still another object of the present invention is to provide wheel front and rear sections having aligned holes for joining the sections into a wheel with opposing wheel flanges and a web section therebetween, and which aligned holes also align with each of the insert anchor plate holes that, along with the wheel front and rear section holes, receive bolts fitted therethrough for maintaining the assembled insert ring to the wheel with the insert ring positioned within a tire whose bead ends are maintained between the wheel flanges.

Still another object of the present invention is to provide a run flat tire insert system that is to be fitted into a tire during the tire mounting process to have its top surface spaced a selected distance from the undersurface of the tire tread so as to provide a minimum tire side wall flexure should air be lost from the tire during operation causing the tire collapse onto the insert ring top surface, minimizing heat build up at the tire side walls from tire side wall flexure, so as to allow a vehicle to travel a significant distance and speed after the tire has gone flat.

Still another object of the present invention is to provide a run flat tire insert system that can be easily mounted in a tire during the process of mounting the tire onto a wheel having front and rear sections, and where the tire insert can be easily dismounted from a worn tire and refitted into a new tire.

The present invention is a tire insert system for mounting to a wheel whereto is mounted a tire, with the tire insert system fitted into the tire mounted on that wheel. The tire insert system includes individual arcuate shaped outer bars formed from an elastomeric material, that is preferably a mixture of urethane material constituents. Which urethane constituents are selected to have a desired hardness so as to support a tire tread under a load collapsed thereon by the deflation of the tire, and yet will still provide some resiliency to cushion the tire inner surface and promote its rebounding off of the insert surface should the tire, while still under air pressure, strike an object, to deflect the tire tread undersurface onto the tire insert outer surface.

The tire insert assembly is formed in a plurality of sections, preferably four sections, that are fitted together into a ring shape. Each tire insert is fixed onto a disk mounting plate that is at approximately a right angle to the tire insert undersurface and is for mounting to a wheel that is assembled from front and rear wheel sections that, when assembled together, form the wheel for mounting onto an axle at a hub section, that includes flanges separated by a flange web. Which wheel flanges opposing surfaces each receive a tire bead fitted thereagainst whereby, when air is introduced into the tire, the tire will expand and force the beads into sealing engagement with the flanges opposing surfaces, locking the tire between the wheel flanges. To provide for wheel assembly, holes in upper portions of the respective wheel front and rear sections are coupled together, sandwiching the tire insert anchor plates therebetween, as by fitting bolts through aligned holes in each of the upper portions that nuts are turned onto. Which upper portions, prior to fitting bolts therethrough receive the tire insert anchor plates fitted therebetween that have holes formed therethrough to receive the bolts fitted through the wheel sections upper portion holes, coupling the components together to receive the nuts tightened thereon, mounting the tire insert segments anchor plates in side by side relationship, forming the tire insert ring. Which assembly includes the fitting of each tire insert segments into the tire, forming the insert ring with the disk shaped anchor plates fitted together as a ring with an open center, for sandwiching between the wheel front and rear sections. In which tire insert segment assembly and anchor plate coupling into the wheel, the assembled tire insert inner circumference is snugly fitted to the web surface between the wheel flanges.

The tire inserted segment are preferably arch shaped castings where a right angle top end of each of the tire insert segment anchor plates are aligned in a mold that receives a pour of urethane material that, when cured, encapsulates each tire insert segment anchor plate right angle end in the arch shaped tire insert segment, providing a permanent coupling of the tire insert segment components for convenient fitting into a tire during the wheel assembly and the mounting of the tire to the wheel. Which tire insert segment anchor plates right angle ends are preferably somewhat curved and may, to increase the bonding area, have corrugations or other angle bends, formed therein for increasing the bond area.

While the tire insert segments can be of like arches of approximately ninety degrees each, it is preferred that the top and bottom segments are of less arch than the arch of the side segments, facilitating their fitting into the tire, in side by side position, forming the ring shaped tire insert within the tire, and with the anchor plates forming a disk that is open across its middle area.

DESCRIPTION OF THE DRAWINGS

The invention may take physical form in certain parts and arrangement of parts, that are used to form the apparatus of and practice the steps of the assembly of the invention into a run flat tire insert that are herein shown as a preferred embodiment and will be described in detail in this specification and illustrated in the accompanying drawings which form a part hereof.

DETAILED DESCRIPTION

Figure 1:
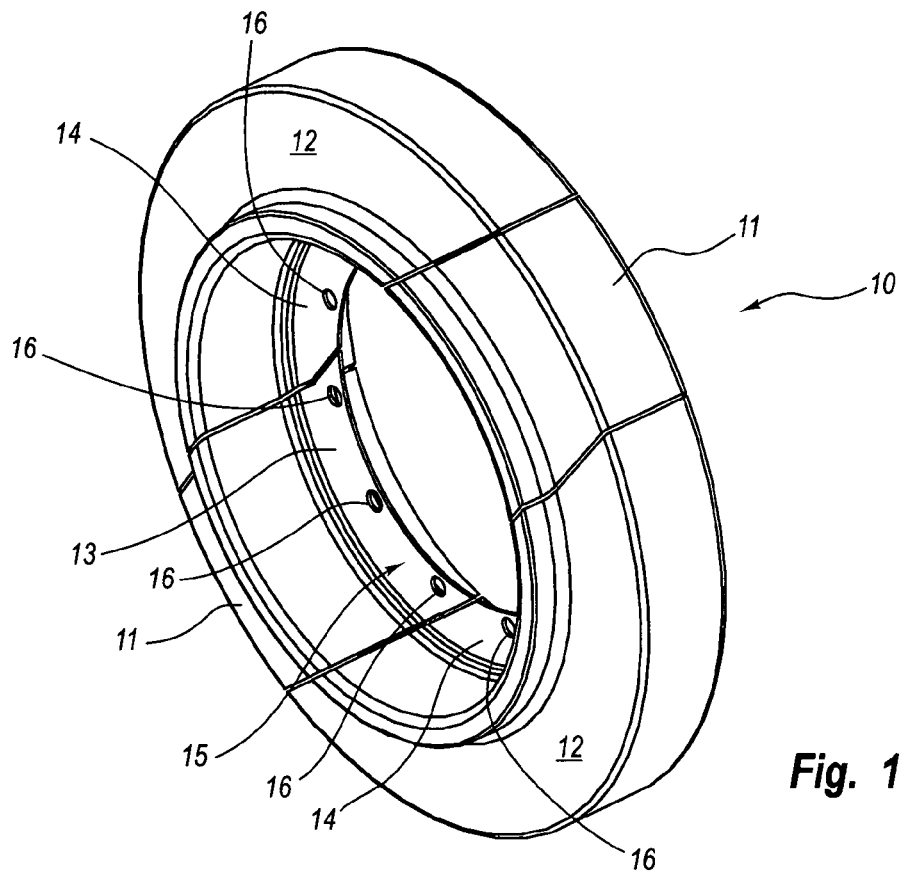
FIG. 1 shows a side elevation perspective view taken from the rear of the tire insert segments that have been assembled into a ring and showing anchor plates of the tire insert segments assembled into a disk that is open across its center.
Figure 2:
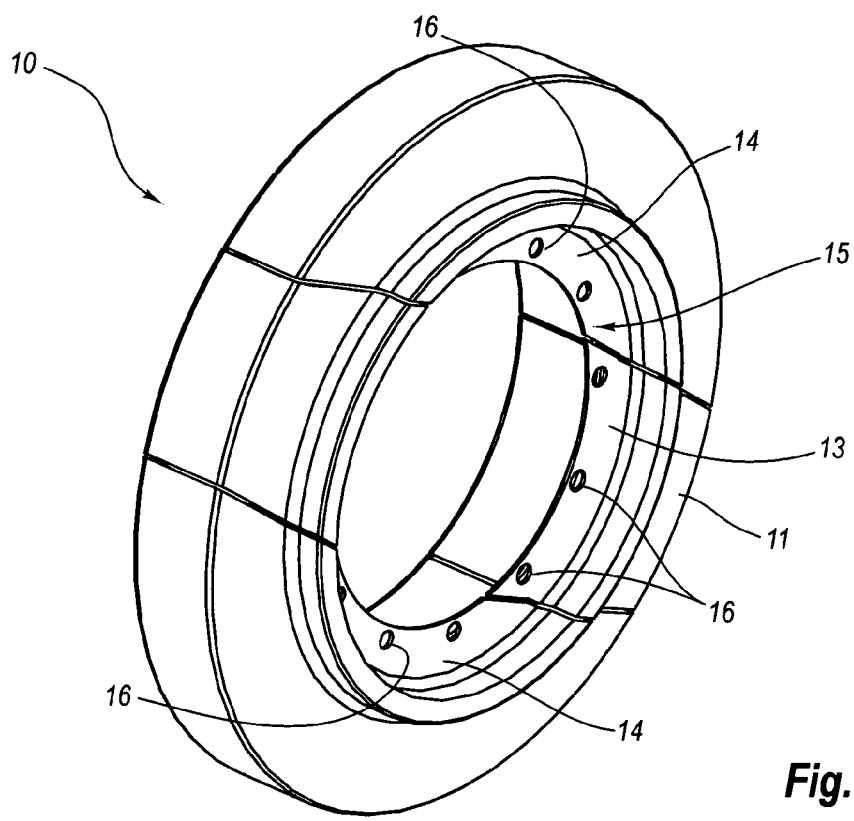
FIG. 2 shows a side elevation perspective view like that of FIG. 1 only taken from the front of the assembled tire insert segments.
Figure 7:
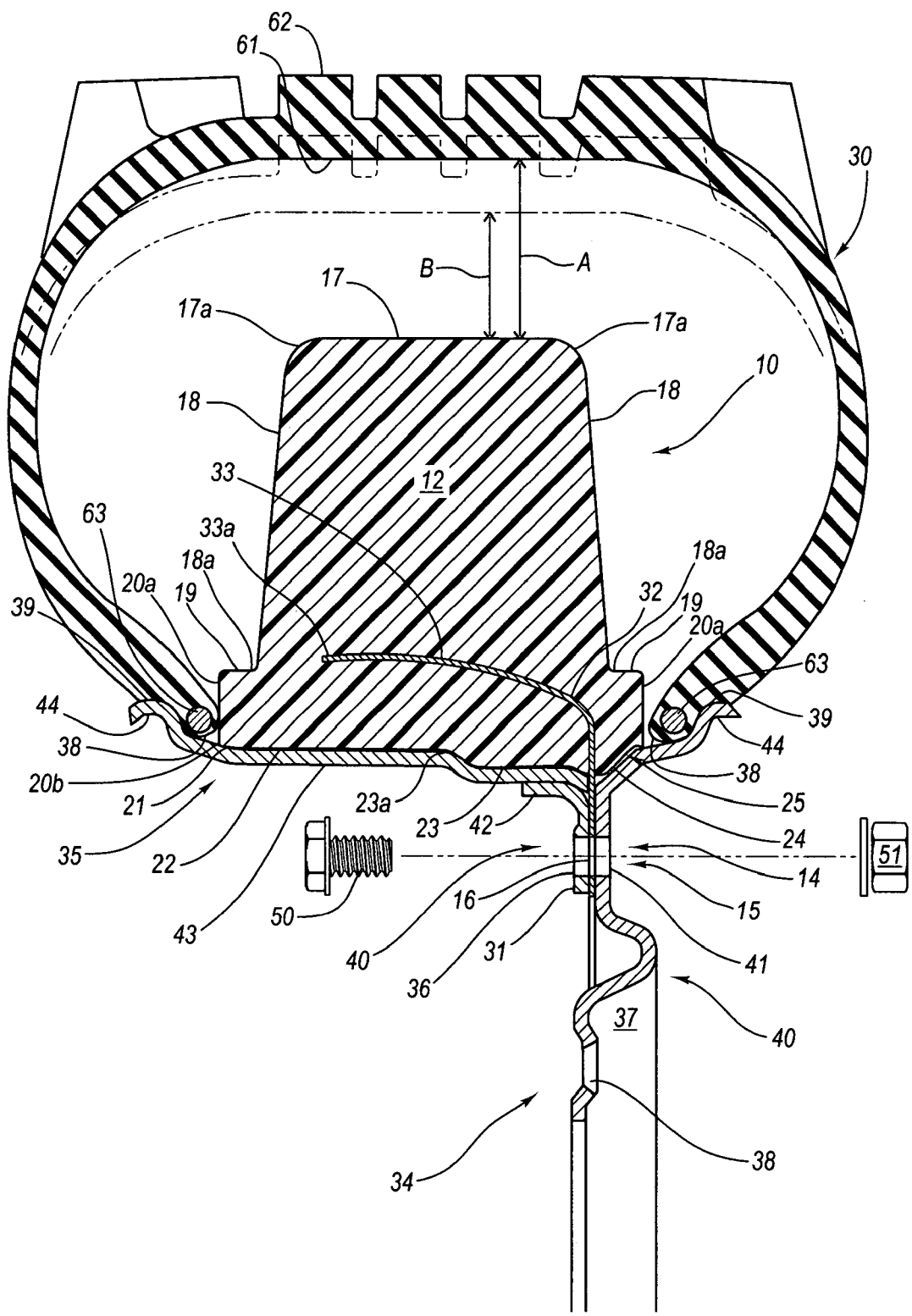
FIG. 7 shows the sectional view of FIG. 6 that further includes a sectional view of a tire mounted between wheel flanges and includes the tire insert segments assembled into a ring and contained in the mounted tire.

The invention is a tire insert system that is shown assembled in FIGS. 1 and 2 into a tire insert ring 10 that is for assembly in a tire, that is mounted onto a wheel 34, as illustrated in FIG. 7. The tire insert ring 10 is shown in a profile perspective view, taken from the rear thereof, in FIG. 1, and as a profile perspective view, taken from the front thereof in FIG. 2. As shown, the tire insert ring 10 is formed from arcuate segments, and the figures show four separate arcuate segments as making up a complete insert ring 10. It should, however, be understood that as few as two arcuate segments are required to form the tire insert ring 10, and so a greater number than two arcuate segments could be so used to form the tire insert ring 10, within the scope of this disclosure.

FIGS. 1 and 2 show four tire insert segments that have been fitted together to form the tire insert ring 10. Which tire insert ring includes a first pair of insert segments 11 that are each of like arcuate shape, are arranged across from one another around the ring and are smaller in arch than a second pair of tire insert segments 12 that are each of a like arcuate shape and are also arranged across from one another. In practice, the tire insert segments 11 each have an arc at their outer curved surface of approximately thirty five (35) degrees and each of the tire insert segments 12 has an arc of approximately one hundred forty five (145) degrees, but which arch relationship can be varied so long as the total of the arcs of the four segments is three hundred sixty (360) degrees. The tire insert segments 11 and 12, when fitted end to end, form the tire insert ring 10. In that assembly, anchor plates 13 and 14 that are individually attached to project downwardly from each of the insert tire insert segments 11 and 12, respectively, include anchor plates 13 and 14 that fit edge to edge to form a flat ring disk 15 that is open across its center area. The assembled anchor plates 13 and 14 flat ring disk 15, as shown, includes equal spaced holes 16 formed through the flat ring disk that are for receiving fasteners, such as bolts with nuts turned there-over, for coupling to a wheel that is assembled from front and rear wheel sections, as set out and described below.

Figure 3:
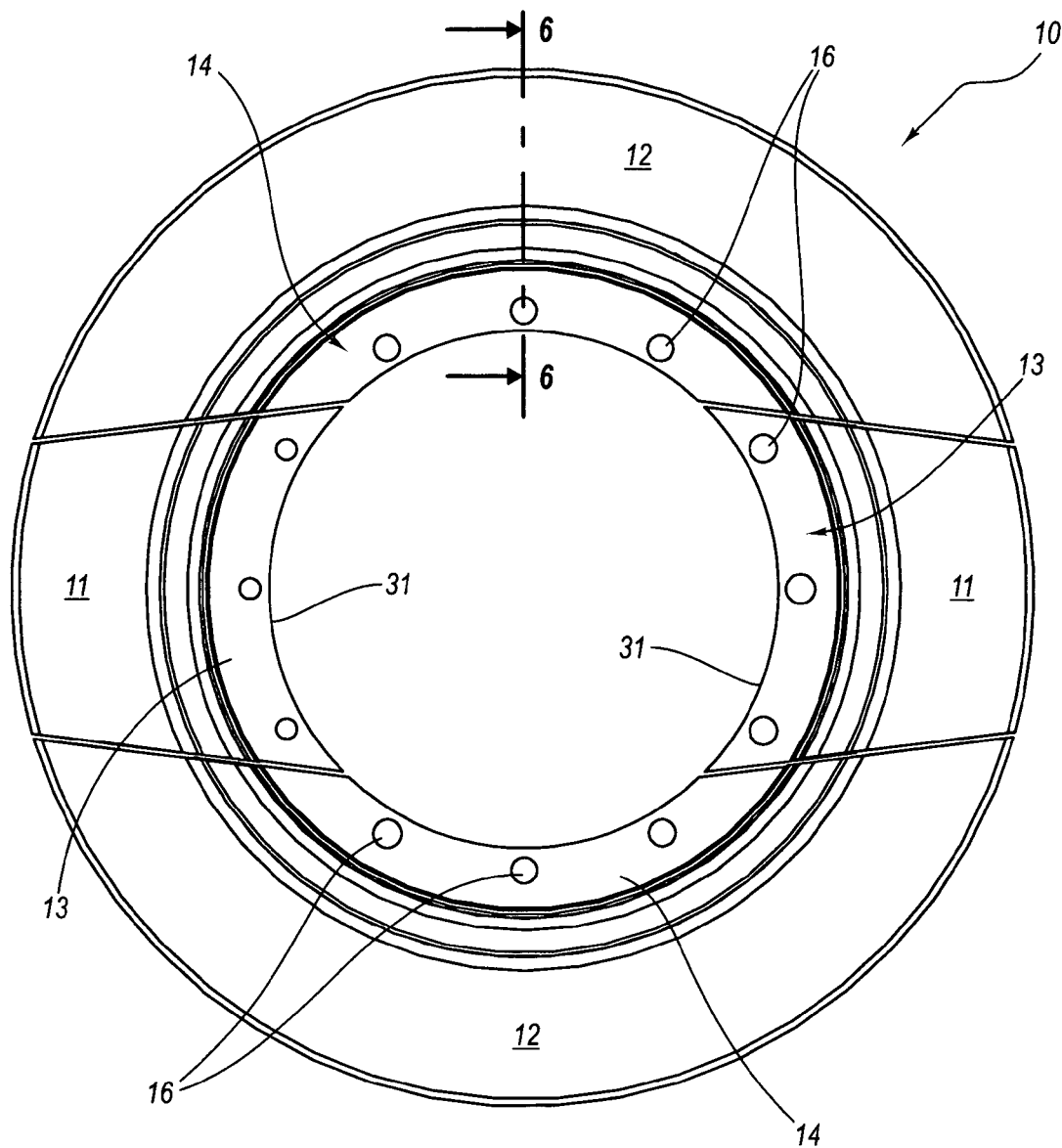
FIG. 3 shows an enlarged side elevation view of the assembled tire insert segments.

FIG. 3 shows a front elevation view of the tire insert 10 of FIGS. 1 and 2 that includes the individual tire insert segments 11 and 12 assembled into the tire insert ring 10, and showing the anchor plates 13 and 14 extending from the insert segments undersurface formed into a flat disk 15 that is open across its center and wherein the spaced holes 16 are formed. FIG. 3 illustrates the assembled run flat tire insert 10 as it appears fitted into a tire, like the tire 34 shown in FIG. 7.

Figure 4:
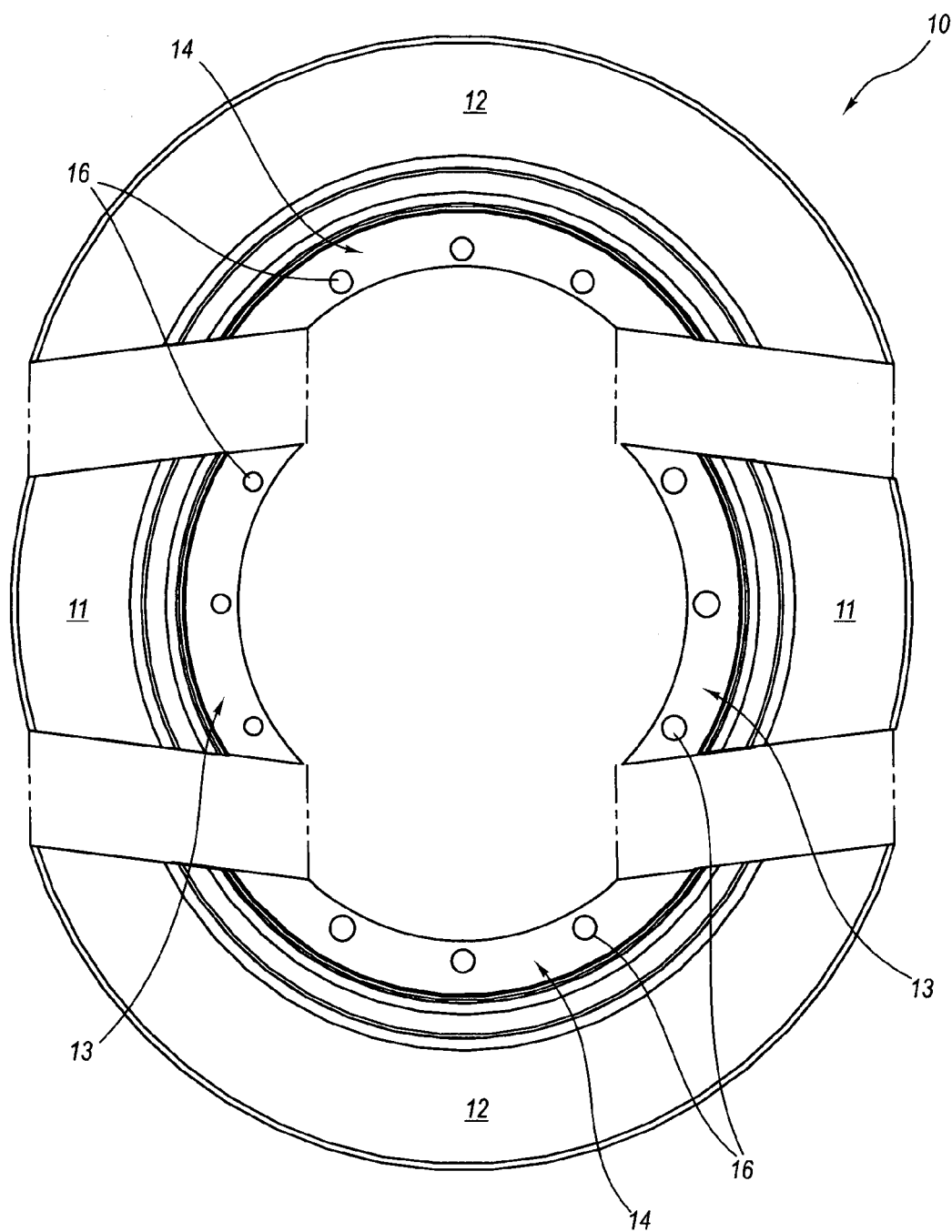
FIG. 4 shows a view like that of FIG. 3 only showing the tire insert segments as having been exploded apart.

FIG. 4 shows an exploded view of the tire insert 10 of FIG. 3, that illustrates how the tire insert segments 11 and 12 that include anchor plates 13 and 14, respectively, are separated for positioning in a tire during the wheel assembly and tire mounting as set out below and discussed with respect to FIG. 7.

Figure 5:
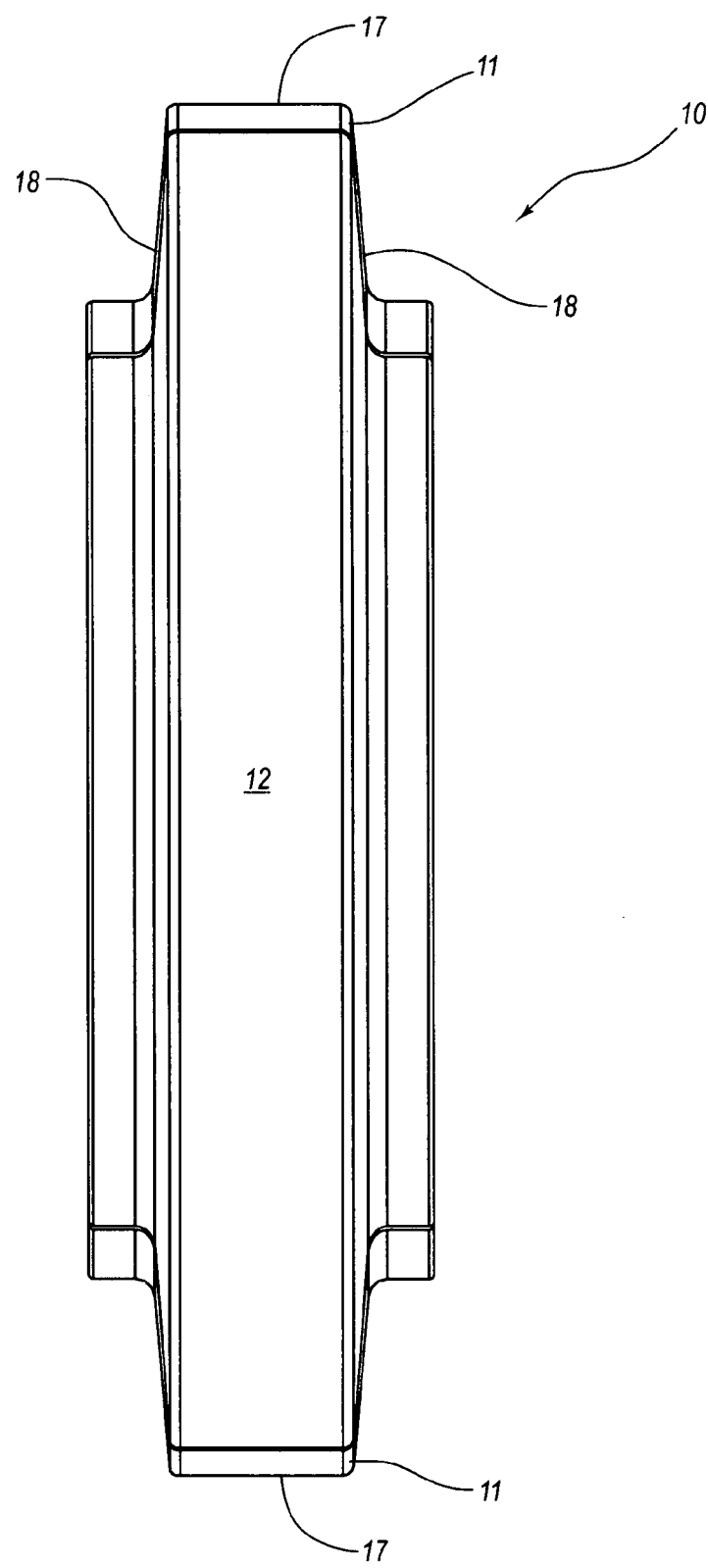
FIG. 5 shows an end elevation view of the tire insert segments assembled into a ring.
Figure 6:
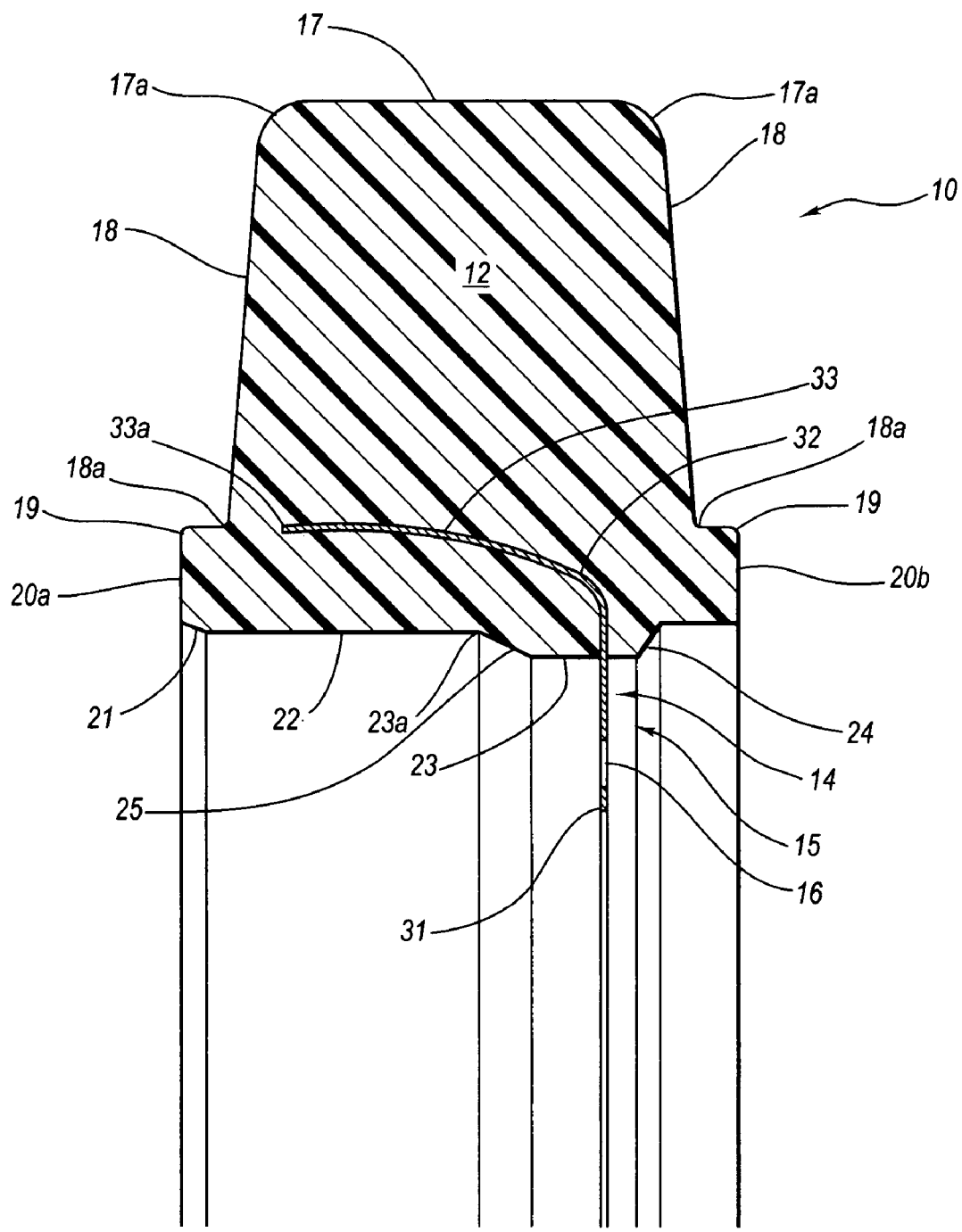
FIG. 6 shows an end sectional view taken along the line 6-6 of FIG. 3.

FIG. 5 shows a profile view of the assembled tire insert 10, showing the smaller arc segments 11 on the top and bottom, respectively, and the larger arc segment 12 on a forward face of the ring shaped insert 10. The tire insert 10 is shown as being essentially flat across its outer surface 17, that, as shown in FIG. 7, contacts a tire 30 inner surface around its circumference 61, below a tire tread 62. So arranged, should the tire 30 deflate, the tire inner surface 61 will engage, and be supported on, the tire insert 10. As shown in FIG. 6, to enhance the load supporting ability of the tire insert 10 the insert sides 18 are each slightly tapered outwardly and are stepped outwardly and end at a step 19, that ends in sides walls 20a and 20b. With the side wall terminating in a sloped section 21 that ends in a base section 22 that extends, as shown in FIGS. 6 and 7, across the tire insert and ends at a junction with a lower end of the side wall 20b. Which base section is contoured into a wheel flange web, and has a greater width than the width of the tire insert 10 across its top surface 17. The tapering of the tire insert sides provides for an efficient load force transmission through the tire insert 10 and into a web 43 of a wheel 34, as shown in FIG. 7. The tire insert 10 is stepped from corners 18a outwardly into steps 19, with the steps 19 form approximately a right angle bend to the side walls 20a and 20b on an outer surface of the tire insert. Which side wall 20a on the inside side of the wheel and tire is sloped inwardly at 21, terminating at the end of an essentially flat insert base section 22 whose opposite end 23a slopes downwardly into a contoured section 23 that then slopes outwardly at 24, forming a pier that, in turn, slopes upwardly as a sloped section 25. Which contours of the tire insert bottom surface allow it to fit snugly onto the wheel 34 web 43, as shown in FIG. 7. So arranged, the tire insert 10 undersurface of FIG. 6, closely fitted onto the wheel 34 web 43, provides for evenly distributing a load transferred from the tire insert top 17 around shoulders 17a, through the insert sides 18 and into the wheel 34.

The tire insert 10 includes the insert segments 11 and 12 that are each constructed, as described above and shown in FIG. 1 through 5, for assembly together, in side by side relationship, forming the tire insert 10, that includes the anchor plates 13 and 14. Which anchor plates 13 and 14 are assembled into the flat open center ring disk 15. FIGS. 6 and 7 show sectional views of the tire insert segment 12 and anchor plate 14 of the tire insert ring 10, and show the anchor plate 14 as extending out of the tire insert contoured section 23 as a flat section to a lower end 31 thereof, that is just below the spaced radial holes 16 formed therethrough, and has a top end 32 that is bent at an angle of from ten (10) to thirty (30) degrees into a support section 33 within the tire insert. Which anchor plate 14 from just below the bent top end 32, and across the support section 33, to its end 33a, is encapsulated in the tire insert segment 14. In practice, the anchor plates 13 and 14 support the tire insert segments, are assembled into the flat open center ring disk 15 and have spaced holes 16 that receive fasteners, preferably bolts 50. Which bolts 50 are individually fitted through insert mounting holes 36 that are formed through a leg 42 of the inner or back wheel section 35, and then through, the flat open center ring disk 15 hole 16. Each bolt 50 is then passed through a radial hole 41 that is formed through an upper portion of a forward or front wheel section 40, and the bolt 50 thread end receives a nut 51, as shown in FIG. 7, turned thereon, securing the wheel rear and front sections 35 and 40 together with the flat ring disk 15 of the tire insert 10 sandwiched therebetween. The wheel back and front sections 35 and 40, along with the flat ring disk 15 at the anchor plates 13 and 14, are thereby rigidly secured together.

The wheel 34, as shown in FIG. 7, is formed from the rear and front wheel sections 35 and 40, respectively. The rear wheel section 35 includes the spaced insert mounting holes 36 that are each an equal radial distance out from an end of a leg 42. The front wheel section 40 includes a center section 37 with spaced lug bolt holes 38 formed therethrough, above an open hub area, and tire insert mounting holes 41 above the front section 40. Above the tire insert mounting holes 41 the wheel front section is bent into an end of a wheel web 38 and terminates in a forward wheel flange 39. The back or rear wheel section 35, that is connected to the front wheel section at the leg 42, includes web 43 and a flange 44, forming the wheel whereto the tire insert 10 and tire 30 is mounted.

In which tire insert 10 and tire 30 mounting onto wheel 34, as shown in FIG. 7, the front wheel section 40 flange 39 is fitted over the tire 30 bead 63 and each tire insert section 11 and 12 is fitted into the tire, forming the tire insert ring 10. In which tire insert ring 10 formation, the tire insert anchor plates 13 or 14 are formed into the disk having the spaced holes 16. So arranged, the insert mounting holes 41 of the front wheel section are aligned with the open disk holes 16. The rear wheel section 35 flange 44 is then fitted onto the tire bead 63 and urged into engagement with the tire insert anchor plates, with the holes 36 in leg 42 aligning with the anchor plate and front wheel section 40 holes 16 and 41, respectively. Bolts 50 are then fitted through the aligned holes 36, 16 and 41, and nuts 51 are turned thereover, pulling tire 30 beads 63 together at the wheel section flanges 39 and 44. The tire insert sections 11 and 12 are thereby assembled into the ring shaped insert 10. So arranged, tightening nut 51 onto bolt 50 pulls the rear and front wheel sections 35 and 40, respectively, together with the anchor plate ring 15 sandwiched therebetween. The wheel 34 mounting the tire 30 containing the assembled tire insert ring 10 can thereafter, as shown in FIG. 7, be mounted onto an axle by turning lug nuts, not shown, through wheel lug holes 38, mounting the wheel onto a vehicle brake drum, not shown.

The above set out assembly of the individual tire inserts 11 and 12 are fitted within the tire 30 during tire mounting to wheel 34. This assembly allows for the installation of the insert ring 10 at an optimum location within the tire relative to the undersurface of the tire 30 tread 62, as illustrated by arrow A in FIG. 7. Which positioning provides a clearance indicated by arrow B when the tire 30 is properly aired and is under load. With the assembly of the tire insert segments 11 and 12 within the tire and their connection to the wheel forward or front section, the tire insert 10 is selected to have a diameter at its outer surface that is an optimum spacing distance from the tread 62 undersurface 61. This is a great improvement over earlier continuous insert ring systems whose diameter was limited by the diameter of the tire bead, where, with the one side of the continuous tire insert fitted into the tire, the tire bead had to be physically pulled across the other side of the continuous tire insert. In practice, the tire insert 10 of the invention can be positioned as close as one to two inches to the tire tread undersurface, minimizing the tire side wall folding should the tire 30 lose pressure, greatly reducing tire heating from side wall flexure as is rolls under load and significantly increasing the distance the tire 30, under load, can safely travel.

In practice, a urethane material formed to have a hardness of approximately seventy to ninety Shur A has been used successfully in forming the tire insert segments 11 and 12. Further, while four separate tire insert segments 11 and 12 have been shown for assembly into the tire insert 10, it should be understood that as few as two tire insert segments, arranged for fitting together into a ring as the tire insert 10, for mounting, as shown and described above, to the wheel rear and front sections, could be so used within the scope of this invention. Accordingly, it should be understood, the invention is in a plurality of tire insert segments 11 and 12 for assembly into the tire insert 10 ring, as shown and described.

In practice, the run flat tire insert of the invention has been installed in a heavy duty transport tire where, after its installation, the tire was pressurized to approximately one hundred five pounds per square inch and was mounted on a vehicle to carry a load of approximately seven thousand pounds. In the installation of the tire insert in the tire, the spacing distance between the tire insert ring 10 and the tire surface under the tread was approximately one to two inches. Which arrangement provided a run flat tire that supported the design load after deflation for a significant travel distance greater than fifty miles at speeds of fifty miles per hour.

While a preferred embodiment of our invention in a run flat tire insert, system has been shown and described herein, it should be understood that variations and changes are possible to the invention and method for its assembly into a run flat tire insert, and the materials that are preferably used in its construction, without departing from the subject matter coming within the scope of the following claims, and a reasonable equivalency thereof, which claims we regard as our invention.

We claim:

1. A run flat tire insert system comprising: an arcuate tire insert that includes arcuate tire insert segments for end to end fitting together to form a ring with dimensions to fit within a tire, spaced from a tire tread of said tire, and each said arcuate tire insert segment including an elastomeric insert portion and an arch shaped outer surface that has a same arc as said tire tread, and wherein each said arcuate tire insert segment includes an anchor plate comprising a radially outward arcuate portion embedded in a respective arcuate tire insert segment, and a radially inward portion extending at approximately a right angle from said radially outward arcuate portion, wherein each said anchor plate includes holes formed therethrough and spaced at equal distances apart from one another and at equal radial distances outwardly from a center of said arcuate tire insert segments when they have been fitted together, and said arcuate tire insert segments are formed as first and second pairs with said first pair having a like greater diameter arc than said second pair which has a like lesser diameter arc, said first and second pairs arranged in end to end relationship with the greater arc tire insert segments opposing one another and the lesser arc tire insert segments opposing one another, wherein said radially inward portions of said anchor plates form a continuous flat disk that is open across its center and said anchor plate holes are spaced at equal radial distances from a center of said continuous flat disk; a wheel consisting of front and rear sections that fit together for coupling with fastener means, opposed aligned flanges separated by a web, and a wheel body that has lug holes and a center opening, wherein said front and rear sections have spaced tire insert mounting holes that are aligned with said anchor plates holes; and said anchor plates are sandwiched between said wheel front and rear sections to receive said fastener means for fitting through said spaced tire insert mounting holes and said anchor plate holes, joining said wheel front and rear sections to said anchor plates in an end to end relationship.

2. The run flat tire insert system as recited in claim 1, wherein said arcuate tire insert segments each have the same cross-sectional dimensions, and the first pair of said arcuate tire insert segments have arcs of approximately one hundred forty five (145) degrees and the second pair of said arcuate tire insert segments have arcs of approximately thirty five (35) degrees and said arcuate tire insert segments, when mounted between the wheel front and rear sections, will fit together end to end and form said ring.

3. The run flat tire insert system as recited in claim 1, wherein each arcuate tire insert segment has a cylindrical outer surface and radially outwardly tapering sides and a rim engaging surface that is contoured to fit onto the web of said wheel that is assembled from the front and rear wheel sections.

4. The run flat tire insert system as recited in claim 1, wherein the fastener means for coupling the wheel front and rear sections together to each of said anchor plates comprises bolts having threaded ends for receiving nuts.

5. The run flat tire insert system as recited in claim 1, wherein the spacing distance between a radially outward surface of the ring formed by the arcuate tire insert segments and the undersurface of the tire tread is selected to be between one and two inches dependent upon tire size, design air pressure, and anticipated tire loading to provide a minimum tire side wall folding should a tire mounting the run flat tire insert system fail and the undersurface of the tread of said tire collapse onto said radially outward surface of the ring formed by said arcuate tire insert segments.

6. The run flat tire insert as recited in claim 1, wherein the radially outward portion of each of said anchor plates is cast within a respective arcuate tire insert segment.

7. The run flat tire insert as recited in claim 1, wherein each said arcuate tire insert segment is formed from urethane.

\* \* \* \* \*